(12) United States Patent
McMillan

(10) Patent No.: US 6,789,108 B1
(45) Date of Patent: Sep. 7, 2004

(54) METHOD AND APPARATUS FOR DISSEMINATION OF RICH MEDIA

(75) Inventor: David G. McMillan, Kenneth Square, PA (US)

(73) Assignee: TMX Interactive, West Conshohocken, PA (US)

( * ) Notice: Subject to any disclaimer, the term of this patent is extended or adjusted under 35 U.S.C. 154(b) by 640 days.

(21) Appl. No.: 09/634,686

(22) Filed: Aug. 8, 2000

Related U.S. Application Data

(60) Provisional application No. 60/197,366, filed on Apr. 14, 2000.

(51) Int. Cl.[7] .............................................. G06F 15/16
(52) U.S. Cl. ................. 709/206; 379/88.11; 379/88.13; 379/88.22
(58) Field of Search ................................ 709/206, 232, 709/250; 379/88.11, 88.13, 88.22

(56) References Cited

U.S. PATENT DOCUMENTS

| | | | | |
|---|---|---|---|---|
| 5,848,415 A | * | 12/1998 | Guck .......................... | 707/10 |
| 5,911,776 A | * | 6/1999 | Guck .......................... | 709/217 |
| 5,961,590 A | * | 10/1999 | Mendez et al. ............. | 709/206 |
| 5,974,449 A | * | 10/1999 | Chang et al. ............... | 709/206 |
| 5,999,975 A | * | 12/1999 | Kittaka et al. .............. | 709/224 |
| 6,018,774 A | * | 1/2000 | Mayle et al. ................ | 709/250 |
| 6,092,114 A | * | 7/2000 | Shaffer et al. .............. | 709/232 |
| 6,240,460 B1 | * | 5/2001 | Mitsutake et al. .......... | 709/235 |
| 6,317,761 B1 | | 11/2001 | Landsman et al. | |
| 6,448,980 B1 | | 9/2002 | Kumar et al. | |
| 6,449,634 B1 | * | 9/2002 | Capiel ........................ | 709/206 |
| 6,449,635 B1 | | 9/2002 | Tilden, Jr. et al. | |
| 6,466,966 B1 | | 10/2002 | Kirsch et al. | |
| 6,604,106 B1 | | 8/2003 | Bodin et al. | |
| 2002/0194049 A1 | * | 12/2002 | Boyd ........................... | 705/9 |

* cited by examiner

Primary Examiner—Frantz B. Jean
(74) Attorney, Agent, or Firm—Duane Morris LLP

(57) ABSTRACT

A computer-implemented method for disseminating information, comprising the steps of: sending an electronic mail message to at least one recipient, said electronic mail being linked to a graphical presentation file, sensing the capabilities of the at least one recipient's computer and, supplying only the elements of the graphical presentation file which may be viewed on the at least one recipient's computer.

42 Claims, 17 Drawing Sheets

METHOD AND APPARATUS FOR DISSEMINATION OF RICH MEDIA

This application claims the benefit of Provisional application Ser. No. 60/197,366 filed Apr. 14, 2000.

FIELD OF THE INVENTION

The present invention relates to a system and method for preparing, disseminating and tracking rich media, and in particular a method and apparatus for preparing, disseminating and tracking electronic mail and graphical presentation content.

DESCRIPTION OF THE RELATED ART

Widespread use of personal computers, modems and data connections has allowed the growth of computer networks. The Internet serves as an example of a type of computer network, and indeed, is a large network of networks, all inter-connected, wherein the processing activity takes place in real time. The Internet offers mail, file transfer, remote log-in and other services. The World Wide Web (WWW) is the fastest growing part of the Internet. On the World Wide Web (WWW), a technology called hypertext allows Internet addressable resources to be connected, or linked, to one another. The advertising value of the Internet has been well recognized. For example, many websites on the Internet utilize "banner" advertisements which allow a user to link directly to the advertiser's website. Additionally, many websites include full-motion video components (also referred to as "rich media") created using FLASH™ (Macromedia, Inc.) or related technologies (e.g., QuickTime (Apple Computer, Inc.), Shockwave (Macromedia, Inc.), Windows Media (Microsoft, Inc.), Real Player (Real Networks, Inc.), etc.).

E-mail has also been utilized as an advertising tool. Advertisers may send emails including textual advertising information, or even hyperlinks to websites which provide advertising information. Sometimes, advertisers will attach textual or visual information to a e-mail directed towards a certain consumer or group of consumers. However, due to the multitude of different e-mail programs on the market today, often times users cannot open or "see" the attachments which contain the advertising information. Thus, although an advertiser may have sent an advertisement e-mail to 100,000 users, it is possible that less than ten percent (10%), i.e., less than 10,000, users actually saw the advertisement.

Therefore, there is currently a need for a method and apparatus for disseminating advertising information through e-mails so that the information reaches all its intended recipients.

SUMMARY OF THE INVENTION

The present invention is a computer-implemented method for disseminating information, including the steps of: sending an electronic mail message to at least one recipient, said electronic mail being linked to a graphical presentation file, sensing the capabilities of the at least one recipient's computer and, supplying only the elements of the graphical presentation file which may be viewed on the at least one recipient's computer.

The above and other advantages and features of the present invention will be better understood from the following detailed description of the preferred embodiments of the invention which is provided in connection with the accompanying drawings.

DETAILED DESCRIPTION

Figure 17:
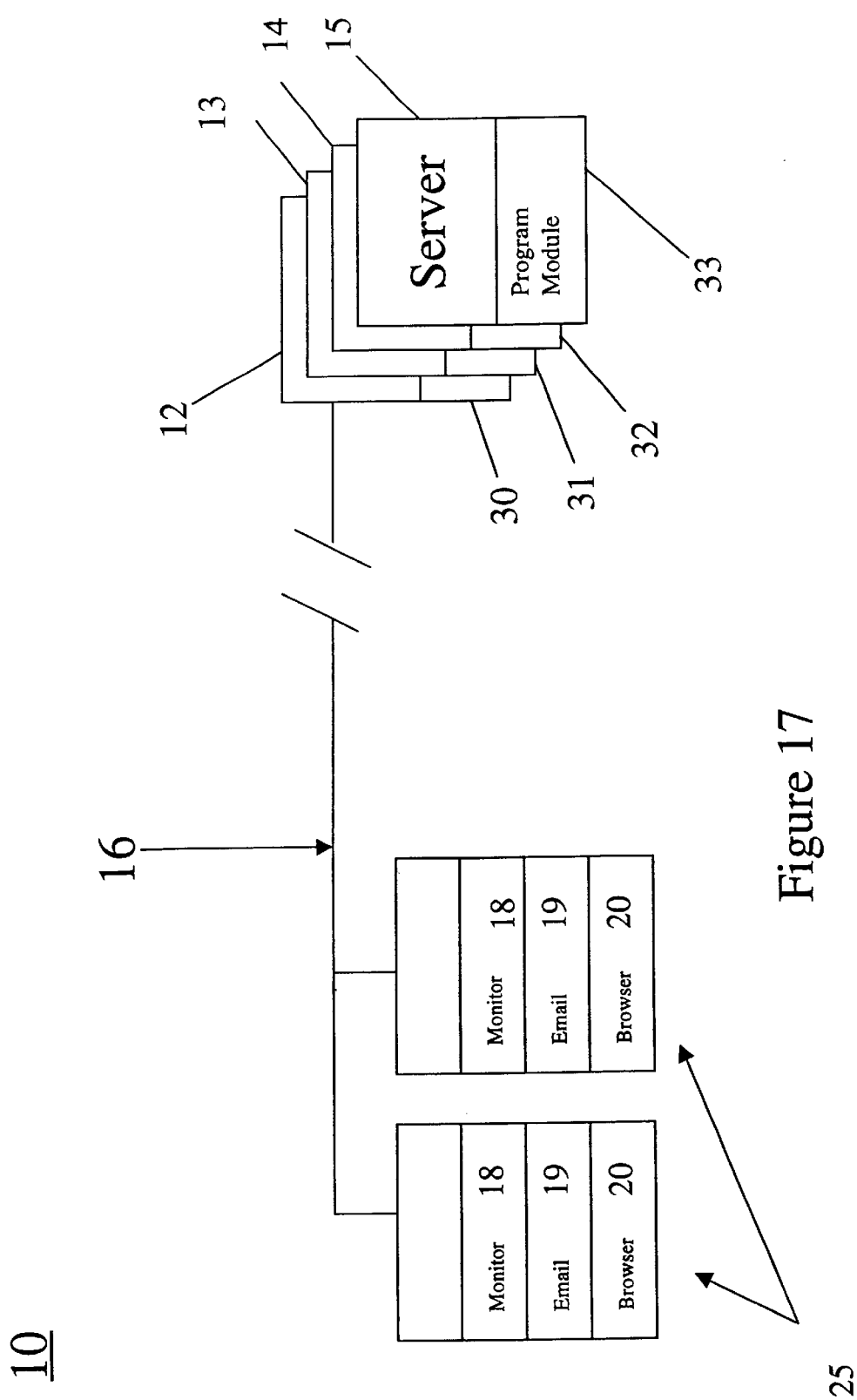
FIG. 17 is a block diagram showing a system according to an exemplary embodiment of the present invention.

Referring to FIG. 17, there is shown a system 10 according to an exemplary embodiment of the present invention. The system 10 includes a plurality of server computers 12–15 and a plurality of users' computers 25 (clients). The server computers 12–15 and the user computers 25 may be connected by a network 16, such as for example, an Intra net or the Internet. The user computers 25 may be connected to the Intra net or Internet by a modem connection, a Local Area Network (LAN), cable modem, digital subscriber line (DSL), or other equivalent connection means. Each user computer 25 preferably includes a video monitor 18 for displaying information. Additionally, each user computer 25 preferably includes an electronic mail (e-mail) program 19 (e.g., Microsoft Outlook®) and a browser program 20 (e.g. Microsoft Internet Explorer®, Netscape Navigator®, etc.), as is well known in the art.

Server computer 12 preferably comprises an "e-mail server" which includes at least one program module or 'engine' 30 (explained in detail below) which operates to send e-mails to the user computers 25. Server computer 13 preferably comprises a "content server" which includes at least one program module or 'engine' 31 (explained in detail below) which operates to distribute content (e.g., video, audio, text, etc.) to the user computers 25 and preferably to assist in tracking of such content. Server computer 14 preferably comprises a "reporting server" which includes at least one program module or 'engine' 32 (explained in detail below) which operates to provide reporting information (e.g., click-through, forwarding, etc.) on the e-mail and content (video and audio) distributed by the servers 12–13. Finally, Server computer 15 preferably comprises a "database server" which includes at least one program module or 'engine' 33, and which stores information regarding, for example, customer requirements and specifications. Each of the program modules 30–33 includes program code, preferably written in Hypertext Mark-up Language (HTML), JAVA™ (Sun Microsystems, Inc.), Active Server Pages (ASP) and Extensible Markup Language (XML).

The system 10 operates by the process 100 (described below) to distribute e-mail and content (e.g., video, audio, text, etc.) from the servers 12–15 to the users of the system via user computers 25, and to track the subsequent use and forwarding of the content. In the preferred embodiment, the content comprises "rich media content, such as a FLASH™-generated program file (e.g., electronic commercial) which is embedded in an e-mail, so that when a user opens the e-mail, the FLASH™ program file begins to play automatically (if the user computer 25 includes software permitting instantaneous play). FLASH™ file format is a file format that allows the delivery of, for example, movies and animation, including interactive animation, to browsers with the necessary plugins. If the user computer 25 does not permit instantaneous play of the content, the system 10 senses this and displays the content in a form which is permitted by the user computer (as explained in more detail below). In addition to a FLASH™ program file, the content may include other elements such as, text, graphics, audio, and user queries (referred to herein as "special conditions").

The following description will refer to both customers and users (or clients). It should be noted that the term "customer" refers to a customer of an operator of the system 10 (and performer of process 100, described below). Such a customer may be a corporation or individual who wishes to send content (e.g., FLASH™-produced commercials) over the network 16 to the user computers 25. The term "user" or "client" refers to the receivers of the content (e.g., individuals who have been targeted by the "customer" to receive the FLASH™ commercials).

Figure 1:
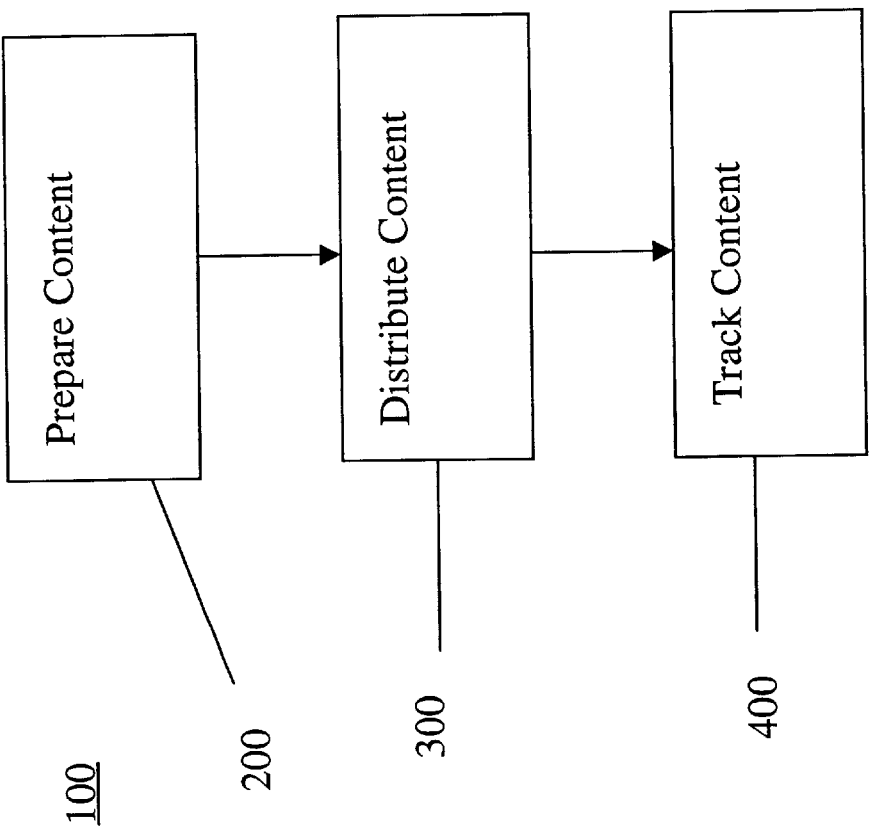
FIG. 1 is flow diagram showing a process according to an exemplary embodiment of the present invention.

Referring to FIG. 1, there is shown a flow chart describing a process 100 for creating, distributing, and tracking information according to an exemplary embodiment of the present invention. The process 100 preferably includes three major steps, preparation of content (step 200), distribution of content (step 300), and tracking of content (step 400). As noted above, the content may be any type of data or information, but in the preferred embodiment comprises FLASH™ program files (or other files created using related technologies such as QuickTime (Apple Computer, Inc.), Shockwave (Macromedia, Inc.), Windows Media (Microsoft, Inc.), Real Player (Real Networks, Inc.), etc.) in the form of electronic commercials and advertising information displayed on the video screens 18 of the user computers 25 of the system 10.

Figure 2:
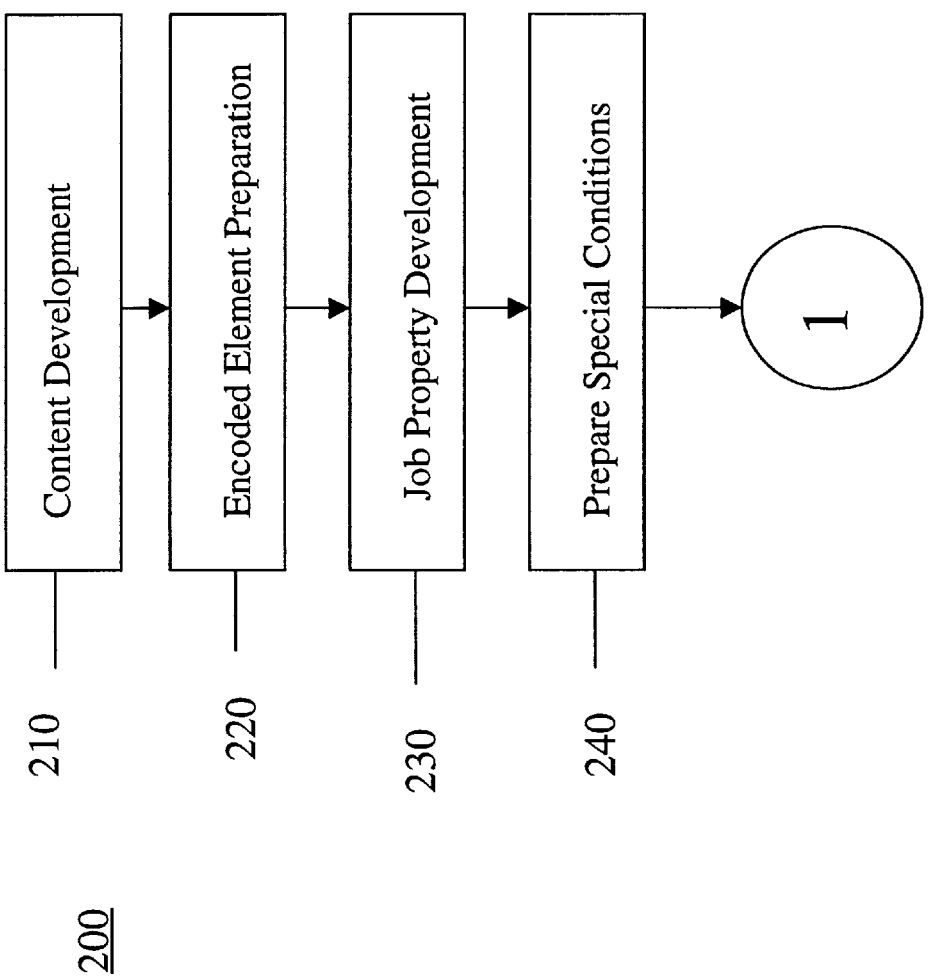
FIG. 2 is flow diagram showing an overall content preparation process according to an exemplary embodiment of the present invention.

FIG. 2 shows the details of the content preparation step 200. As can be seen, the content preparation step 200 includes a content development step 210, an encoded element preparation step 220, a job property development step 230, and a special conditions preparation step 240. Each of these steps will be explained in detail below with reference to FIGS. 5–8.

Figure 5:
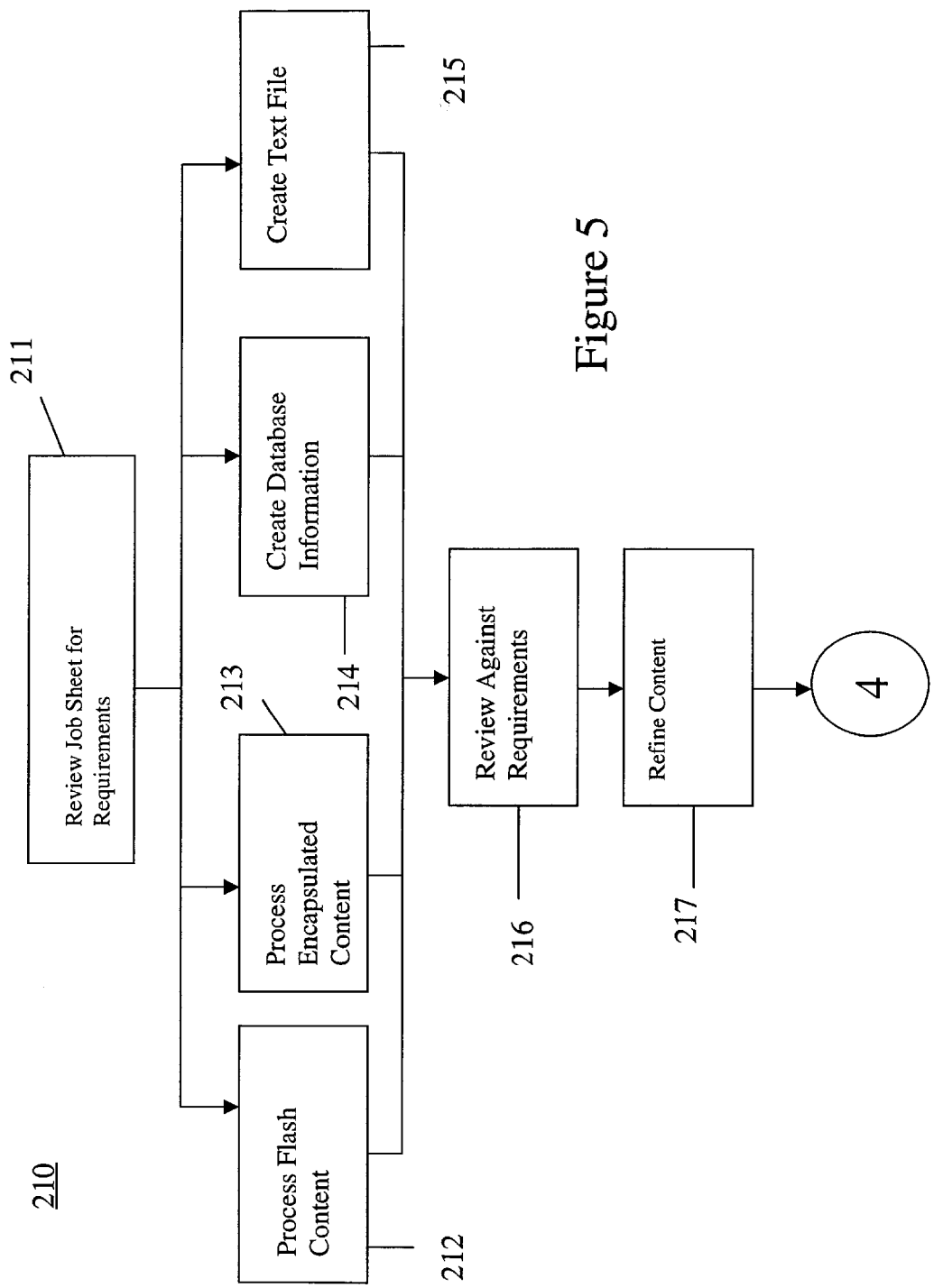
FIG. 5 is flow diagram showing a first step in the content preparation process of FIG. 2.

FIG. 5 shows a content development step 210. As stated above, the content may comprise any type of information, but preferably comprises FLASH™ program files in the form of electronic commercials and advertising information. Prior to the content development step 210, the content has preferably been created and refined by web-artists and programmers. The content may be in the form of a computer program file in the FLASH™ format (".swf" file), or other related video display technologies (e.g., HTML file(s), streaming video). FLASH™ program files are particularly advantageous for advertising purposes, in that during playback (utilizing a browser or otherwise) FLASH™ files appear as full-motion videos to the viewer. Once the content has been created by the programmers and web-artists, the content development step 210 may begin.

First, a "job sheet" is reviewed for the particular requirements of the content. The job sheet is a paper or electronic form which is filled out based on a customer's particular requirements. The term "job" as used herein refers to the processing, sending and tracking of e-mail and content. The job sheet may be filled out by an employee of the content creator, or may be filled out directly by the customer on-line. The requirements may include customer contact information, time length of the content, quality of the content, color standards of the content, job duration (e.g., number of e-mails sent or length of time over which e-mails are sent), maximum plays (e.g., the number of times an electronic commercial may be replayed by users) and custom actions (e.g., queries placed in the content). Once, the job sheet has been reviewed by the content creator, the content is ready to be processed.

Steps 212–215 are steps which are preferably performed concurrently. The video content (e.g., FLASH™ program file) is processed at step 212. This involves matching audio content (soundtrack) with the video content, and modifications to the video presentation for optimum transmission to the user computers 25. "Encapsulated" content is processed at step 213. Encapsulated content comprises the content (video and audio) which is bundled into discrete file packages for transmission. Since all computers do not operate with the same hardware and software, the content must be packaged so that all computers may easily view the content. The different encapsulations (or packages) include an HTML package, an American Online (AOL) package, and a Text-only package. Of course, the above-described packages are the preferred packages known at the time of invention, it should be noted that other packages may be used.

Information is entered in a database (stored on database server 15) at step 214. The information may comprises the customer data obtained from the job sheet at step 211, and other relevant information. A text file which corresponds to the content is created at step 215. The text file may include, for example, a message regarding the content, or identifying a related website to the user. Depending on the specifications of the user computer 25, the text file may appear in an e-mail program display screen, or may appear in a browser program display screens such as when the user uses a Web-based email program (e.g., Yahoo! ® or HOTMAIL™ email services).

After the content has been processed, and the database information has been entered, the content is reviewed against the requirements of the job sheet at step 216. This involves viewing the content via a system of internal computers (referred to herein as "test beds") of the content creator. For example, the refined content is placed on a server (e.g., an internal content server, explained below), and is accessed internally by the content creator to ensure that it can be viewed. If any refinements to the content are required, they are accomplished at step 217.

Figure 6:
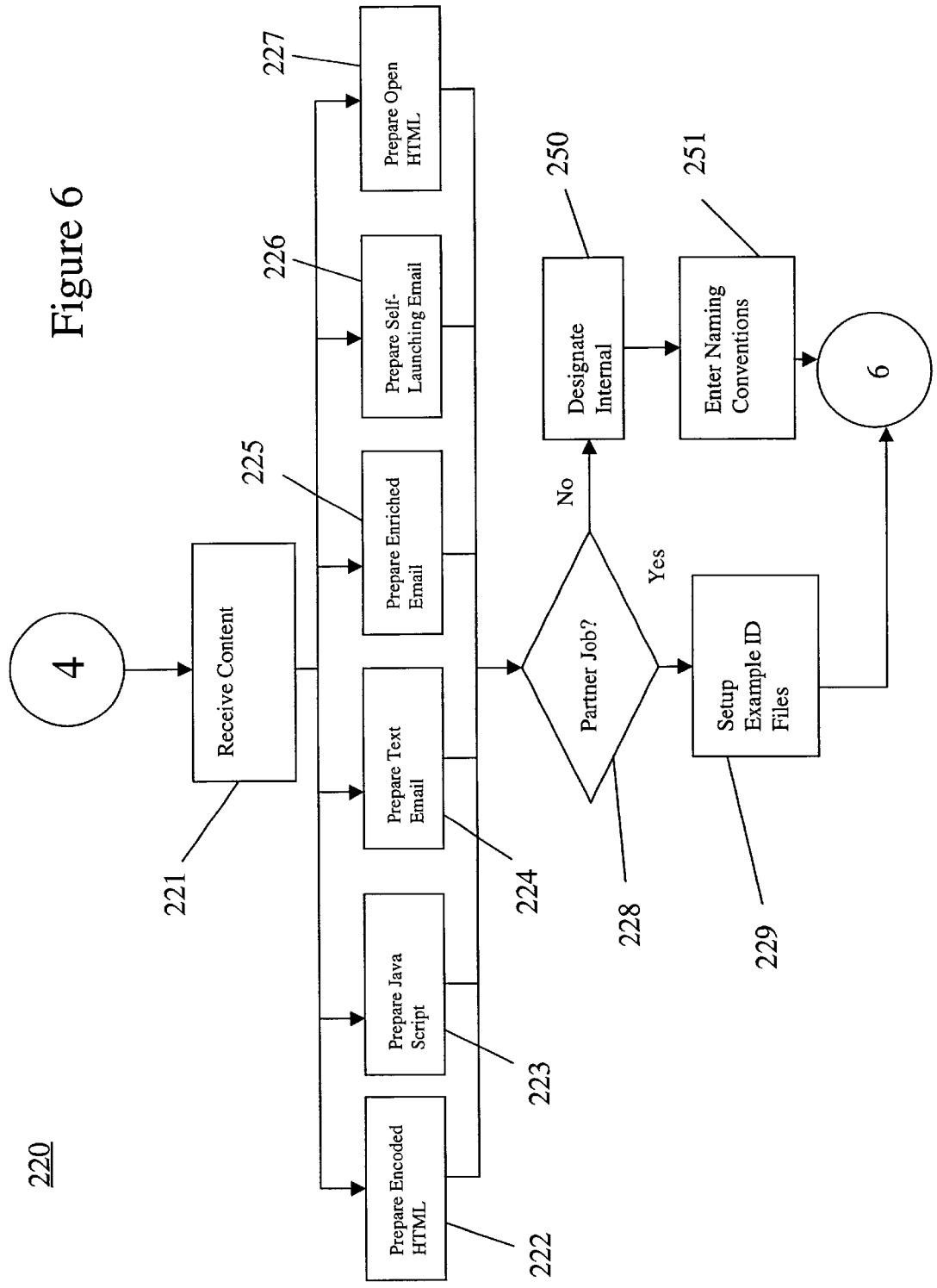
FIG. 6 is flow diagram showing a second step in the content preparation process of FIG. 2.

FIG. 6 shows an encoded element preparation step 220. To begin this process, the content prepared and processed in step 210 is sent to an internal content server (not shown) at step 221 (if not already there). The internal content server preferably comprises a server internal to the content creator which is used to refine the content before distribution. Once the content is received at the internal content server, steps 222–227 are performed (preferably concurrently). Step 222 involves preparation of an encoded HTML servant. Step 223 involves preparation of a Java script servant. Step 224 involves preparation of a text e-mail sending servant. Step 225 involves preparation of an enriched e-mail sending servant. Step 226 involves preparation of a self-launching e-mail sending servant. Finally, Step 227 involves preparation of an open HTML file. The open HTML file is used to generate the encoded HTML servant at step 222, and is then installed on the internal content server and the test beds as a backup for the servant. The self-launching e-mail servant prepared at step 226 is a separate servant which operates to combine the servlets 222–225 and 227 into a master servlet. It will be understood by those skilled in the art, that the above-described "servlets" comprise mini-programs which are utilized selectively based on certain parameters of each user computer 25, such as bandwidth, e-mail program type (e.g., Microsoft Outlook™ or a Web-based email program or service) and browser type, as explained below.

At this point, it must be decided whether the job is a "partner" job or an "internal" job at step 228. If the job is a "partner" job, the process proceeds to step 229 where a "partner template" is prepared. The "partner template" essentially comprises a file containing information on the partner's responsibilities (e.g., names and e-mail addresses of targeted persons, if the partner will take on e-mailing responsibilities) Typically, the "partner template" is saved as a ".zip" file at the content server 14 and sent to the partner in compressed format. For an "internal" job, the process proceeds to step 250 (from step 228), where the job is designated as internal. Then, at step 251, a e-mail engine (i.e., a computer program preferably disposed on the e-mail server 12) is chosen for the dissemination of e-mails to user computers 25. The process 100 then proceeds to a job property development step 230, as explained below.

Figure 7:
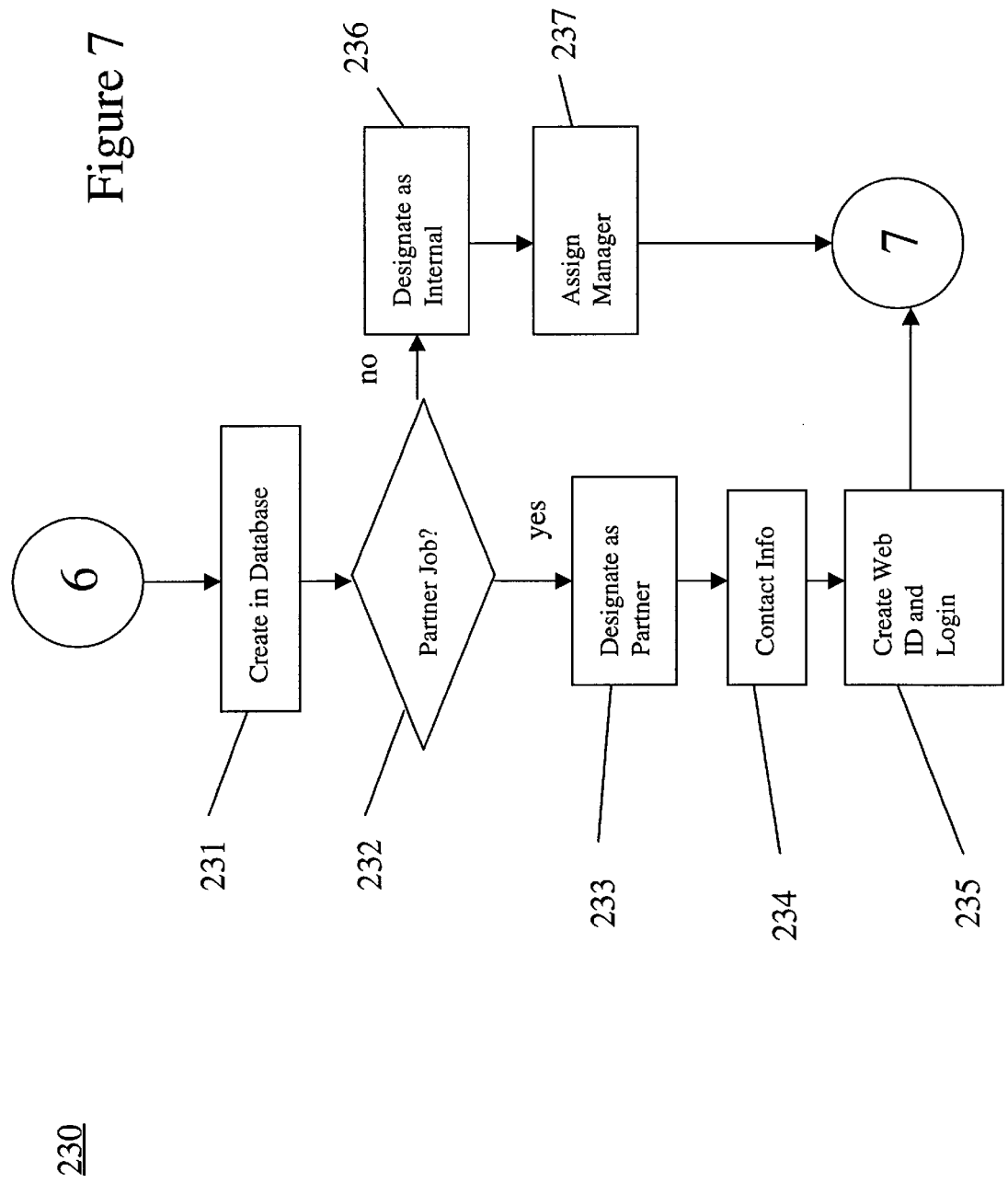
FIG. 7 is flow diagram showing a third step in the content preparation process of FIG. 2.

FIG. 7 shows a job property development step 230. In this step, the different requirements of the "job" are logged. The term "job" as used herein refers to the processing, sending and tracking of e-mail and content. First, job information obtained from the job sheet at step 214 is entered into the database server 15 at step 231. Preferably, each job has a particular job identification number ("job number") associated therewith for tracking purposes (explained below with reference to FIG. 11). The job number may comprise any number of characters (letters, numbers, etc.) arranged in any order, and is preferably used to identify separate jobs from one another. At step 232, it is again decided whether the job is an "internal" job or a "partner" job. Since one entity may not have the resources to provide both e-mailing functions and provision of content (e.g., FLASH™ files), sometimes it may be necessary to partner with another entity. For example, one entity may store the content on their server, and another entity may store e-mail information on their server, and provide for the mailing of the e-mails to the intended recipients through a program (engine) stored on the server.

If the job is a "partner" job, the process proceeds to step 233 where partners are designated. Next, at step 234, the contact information for the partners is entered into a database server (e.g., database server 15; FIG. 17). Job managers from each partner are also selected and set at this point, the job managers overseeing the respective functions of their partner. Finally, at step 235, a Web Identification (Web ID) and Login Password (Password) are set for each partner, so that all the partners can share in reporting information posted to a specified website which may be stored on the reporting server 14 (explained in detail below).

For an "internal" job, the process proceeds to step 236 (from step 232), where the job is designated as internal. Then, at step 237, an internal job manager is assigned to oversee the job. The internal job manager has access to all reporting information for all jobs, and therefore, there is no need to set Web IDs and Passwords.

Figure 8:
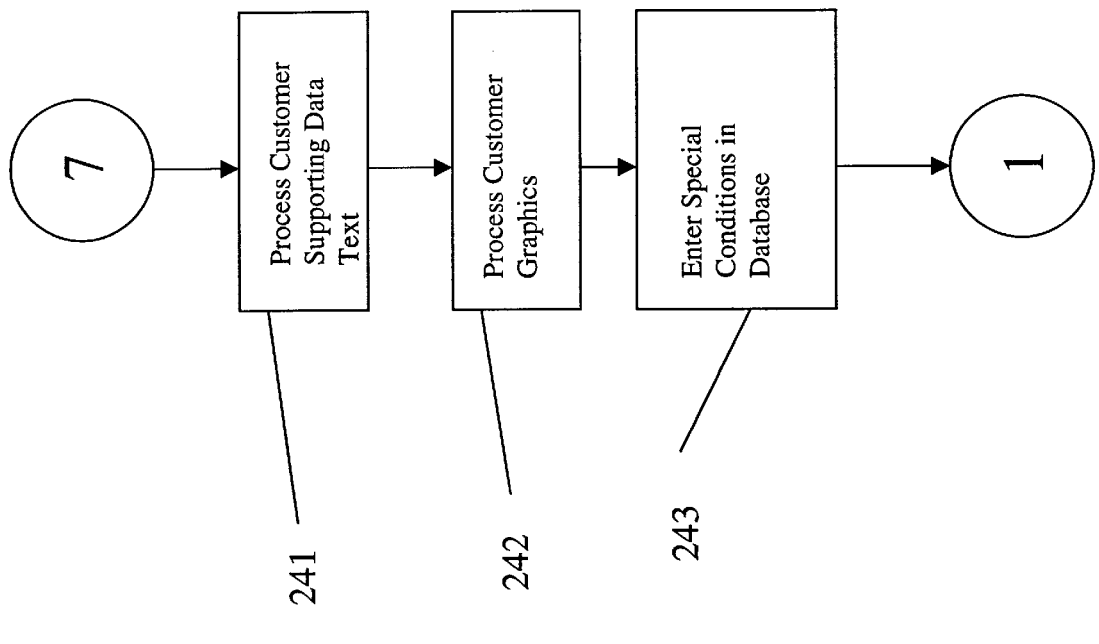
FIG. 8 is flow diagram showing a fourth step in the content preparation process of FIG. 2.

FIG. 8 shows a special conditions preparation step 240. In this step, any special requirements of the customer are added to the content (e.g., FLASH™ file, e-mail, etc.). First, at step 241, any supporting text supplied by the customer is processed to ensure it can be displayed (in either an e-mail program or a browser) and included in the content by placing it on the content server 13. Next, any supporting graphics supplied by the customer are processed and included in the content (step 242) by placing them on the content server 13. Finally, any special logic conditions specified by the customer are entered into the database server 15 (step 243). Special logic conditions may include such things as queries to a user (e.g., "would you consider buying this product, yes or no?"), or automatic substitutions of data on a daily or weekly basis. For instance, a customer may want to change the supporting text every week (in order to keep the content current), or may want to poll users with questions to determine particular content needs. If the customer has not supplied any special conditions, the process proceeds directly to the content distribution step 300.

Special conditions may be utilized in a variety of ways to customize a particular campaign towards a certain set of users. The customization of the content (and the campaign) towards a particular set of users increases the effectiveness of the campaign, and makes the content more interesting. For example, a first set of e-mails with associated content files (first campaign) may be sent to a group of 50,000 people. Based on the user responses to special conditions, the campaign may be refined to target only those users who are interested. This can be easily accomplished through the automatic substitution of data and content (which may be stored on the content server 13 as described above), and the transmission of a second set of e-mails with associated content files (second campaign). In the second campaign, the e-mails may be addressed to the users directly (e.g., "Dear Dave . . . "), and the content may be altered to provide more or additional information from the first campaign. Such campaigns may continue on, thereby further refining the user group. Thus, through the use of special conditions, the present process 100, can sense the desires of each user and supply additional data and content to customize the e-mail and content to the particular user's desires.

Once the special conditions have been entered in the database, the content preparation step 200 is complete. The content may now include a main content file (e.g., FLASH™ file), supporting text, supporting graphics, and special conditions. Next, the process 100 proceeds to the content distribution step 300.

Figure 3:
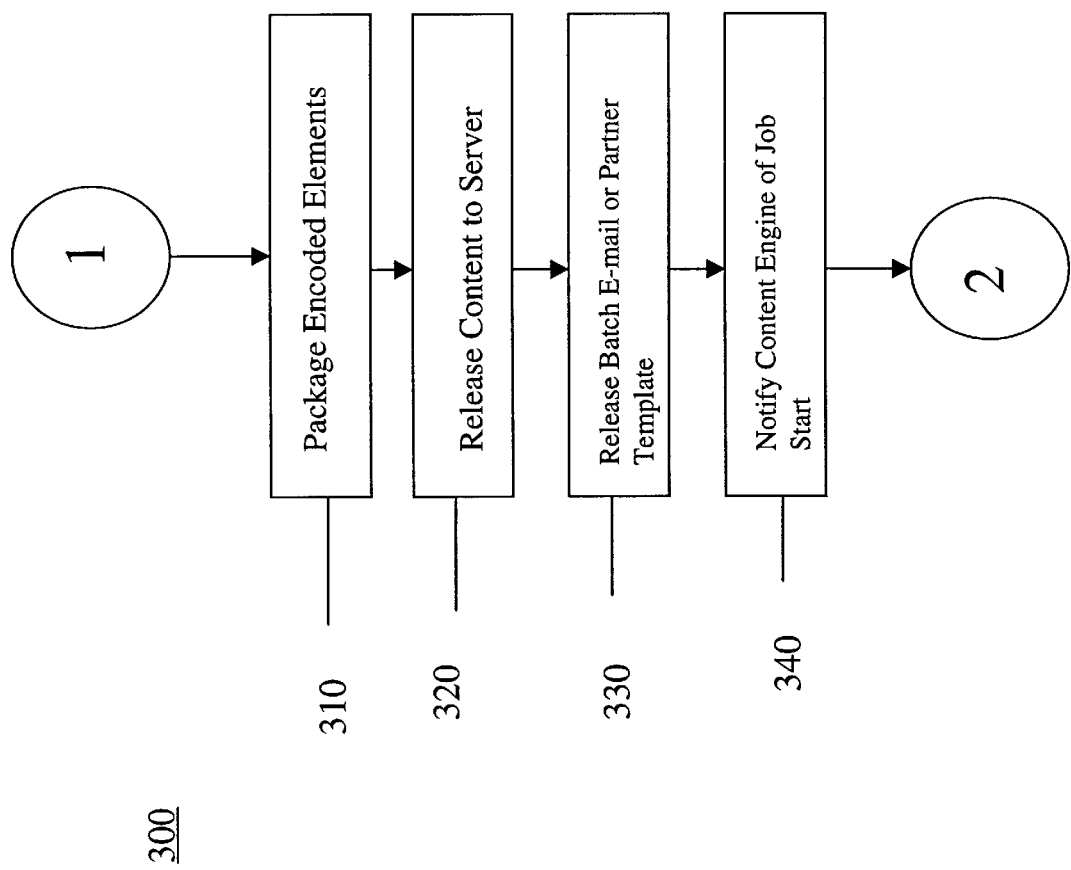
FIG. 3 is flow diagram showing an overall content distribution process according to an exemplary embodiment of the present invention.

FIG. 3 shows the details of the content distribution step 300. As can be seen, the content distribution step 300 includes an encoded element packaging step 310, a content release step 320, a release e-mail step 330, and a content engine notify step 340. Each of these steps will be explained in detail below with reference to FIGS. 9–12.

Figure 9:
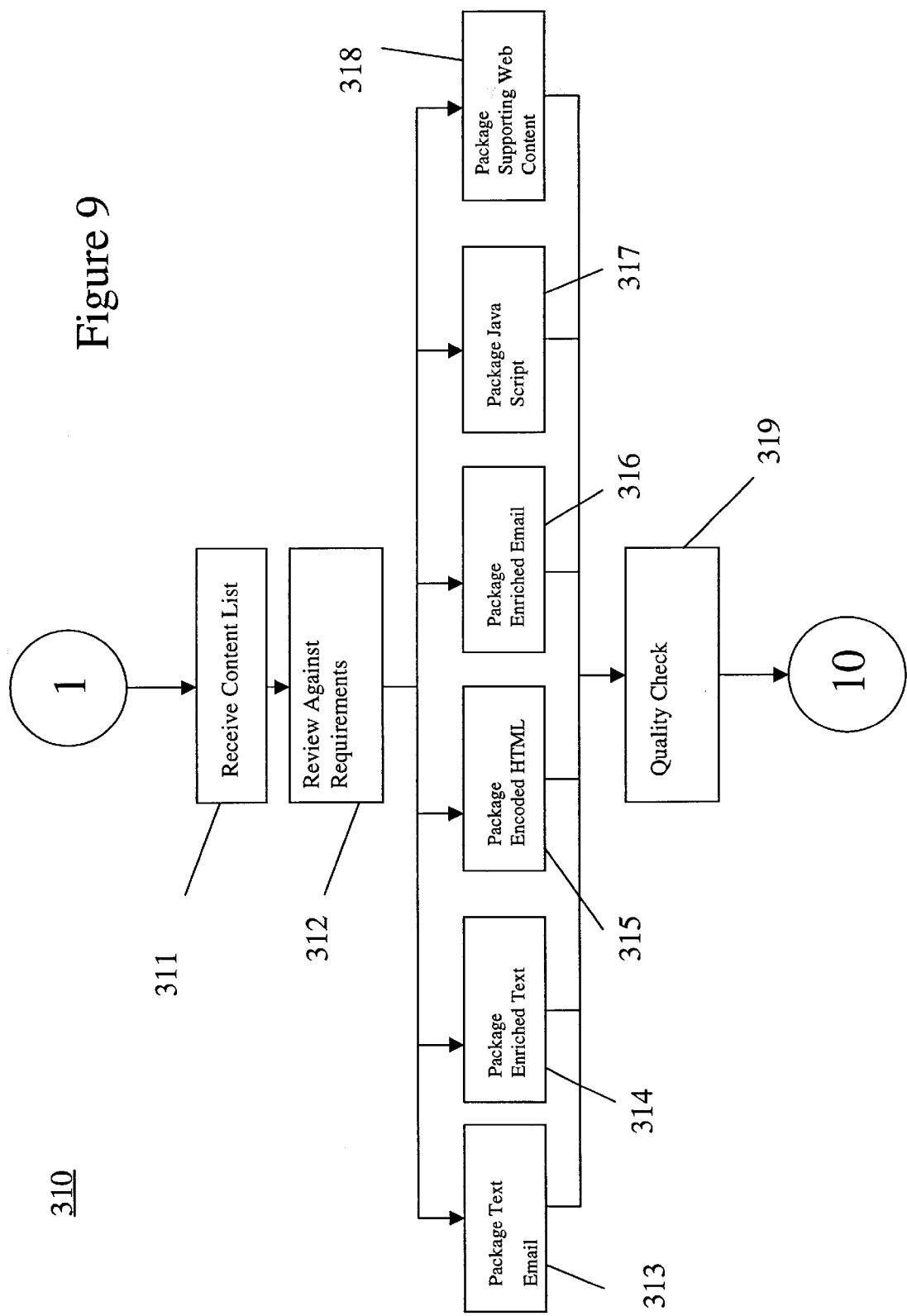
FIG. 9 is flow diagram showing a first step in the content distribution process of FIG. 3.

FIG. 9 shows an encoded element packaging step 310. Once the content has been created and refined, the content is transmitted to an internal content server (not shown) at step 311 (if not already present thereon). As explained above, the internal content server preferably comprises a server internal to the content creator which is used to refine the content before distribution. Then, the content is reviewed to determine that content parameters meet the required specifications at step 312. This may be accomplished by either a physical inspection performed by a computer operator or by an automated inspection program (preferably resident on the internal content server). The content is then packaged for sending at steps 313-318 (preferably performed concurrently). As stated above with reference to FIG. 6, different packages are required depending on the capabilities of the user computer 25. Therefore, some of the packages described below may not be required on some user computers 25 which have more advanced software. For example, a text-only e-mail sending element (packaged at step 313) may not be required for newer systems which have advanced browsers (with plug-ins and links to other programs) and advanced e-mail programs, but would be required on older systems where an e-mail program may not necessarily be linked to a browser or other programs.

A Text-only e-mail sending element is packaged at step 313, which corresponds to a Text-only package (e.g., low quality grade). An AOL e-mail enriched text sending element is packaged at step 314, which corresponds to an AOL package (e.g., medium quality grade). An HTML e-mail sending element is packaged at step 315, which corresponds to a HTML package (e.g., high quality grade). An enriched e-mail sending element, a Java script encoding element, and a supporting web content element are packaged at steps 316–318, respectively (e.g., high quality grade). Each of the packages prepared at steps 313–318 correspond to servlets which were previous prepared in steps 222–227 (See FIG. 6). For instance, the encoded HTML servant prepared at step 222 corresponds to the HTML package 315, the Java servant prepared at step 223 corresponds to the Java package 317, the Text email servant prepared at step 224 corresponds to the Text email package 313, the Enriched email servant prepared at step 225 corresponds to the Enriched text package 314 and the Enriched email package 316, and the open HTML servant prepared at step 227 corresponds to the web content package 318. The self-launching e-mail servant prepared at step 226 in FIG. 6 serves to assemble the servlets 222–225 and 227 into a master servant which may also be packaged.

The fully packaged content is then tested at step 319 (e.g., by sending the packaged content from the internal content server to the test beds). It should also be noted that the Text-only e-mail sending, the AOL e-mail sending element, and the HTML e-mail sending elements packaged at steps 313–315 may be combined into a single file (e.g., ".zip" file) for ease of distribution.

Each of the above "elements" comprise separate program modules which are either utilized or not utilized depending on the capabilities of user computer 25 receiving the e-mail and content. For example, at the very least a user computer 25 will receive and display (on video monitor 18) a standard e-mail message, and at the very most a e-mail message linked to a content file (e.g., FLASH™ file) which begins to play as soon as the user opens the e-mail. Also on the higher end, the e-mail might also include banners, hyperlinks, graphics files (e.g., ".gif", ".jpg"), and queries with icons which may be clicked to respond disposed therein.

Figure 10:
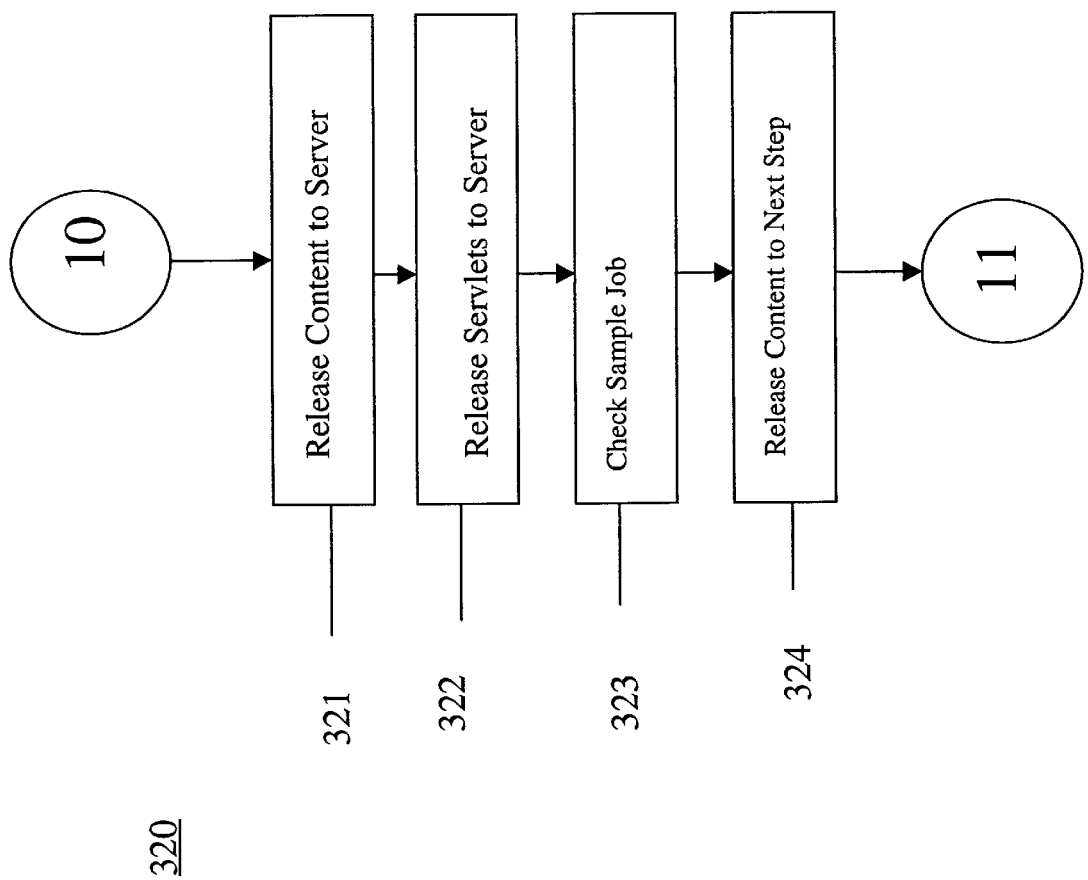
FIG. 10 is flow diagram showing a second step in the content distribution process of FIG. 3.

FIG. 10 shows a content release step 320. First, content is released to an external production server (not shown) from the internal content server at step 321. Then, the servlets (packaged at steps 313–317, described above) are released to the production server at step 322. At this point, the e-mails (linked to content) are ready to be released to the actual users (i.e., user computers 25). However, before that is done, a test run e-mail is sent internally to ensure that everything is working properly at step 323. This process may be as simple as an individual of the content creator or e-mailer sending an e-mail to himself or some other employee of the content creator or e-mailer. Once the e-mail has been test checked, the content is released at step 324 to the next step, namely, a release e-mail step 330.

Figure 11:
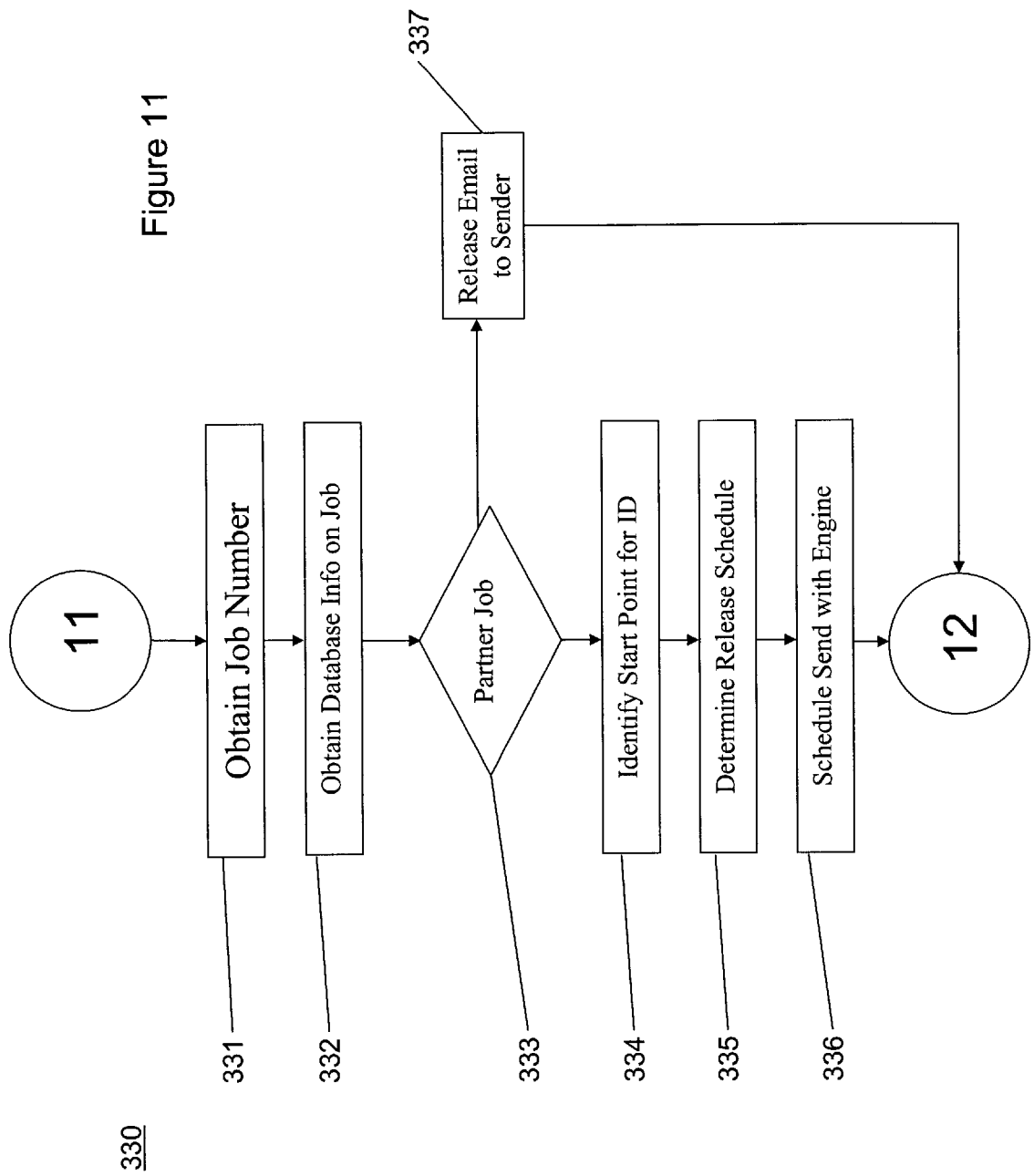
FIG. 11 is flow diagram showing a third step in the content distribution process of FIG. 3.

FIG. 11 shows a release e-mail step 330. This is the step where e-mails are actually sent to users. First, at step 331, a "job number" is obtained for the job, for tracking purposes. To that end, a "job number" database is maintained on the database server 15, containing assigned and available job numbers, which is updated each time a new "job number" is assigned. Next, database information (e.g., job name, etc.) on the job is retrieved from the database server 15 at step 332. Then, at step 333, a decision is made again whether the job is a "partner" or "internal" job (see steps 232 (FIG. 7) and 318 (FIG. 9) above). If the job is a "partner" job, the process proceeds to step 334, where a starting point for an "identification number" (used for tracking purposes) which is different than the "job number" for the job is determined. As with the "job number", a database is maintained on the database server 15, containing assigned and available identification numbers, which is updated each time an identification number is assigned. Accordingly, each e-mail has an associated identification number, so that the progress of that e-mail (e.g., forwards, etc.) can be tracked for reporting purposes. Alternatively to an identification number, the e-mail address of each user to which the message is originally sent (e.g., JoeSmith@aol.com) may also be used to track the progress of the e-mail. Then, a release schedule is determined at step 335. Finally, the e-mail engine of the partner is set to coincide with the predetermined release schedule, and the e-mails are released to the users at step 336. Alternatively, if the job is a "internal" job, a starting point for an identification number (used for tracking purposes) for the job is determined, and the e-mails are released to the users at step 337 (through a e-mail engine preferably resident on e-mail server 12).

Figure 12:
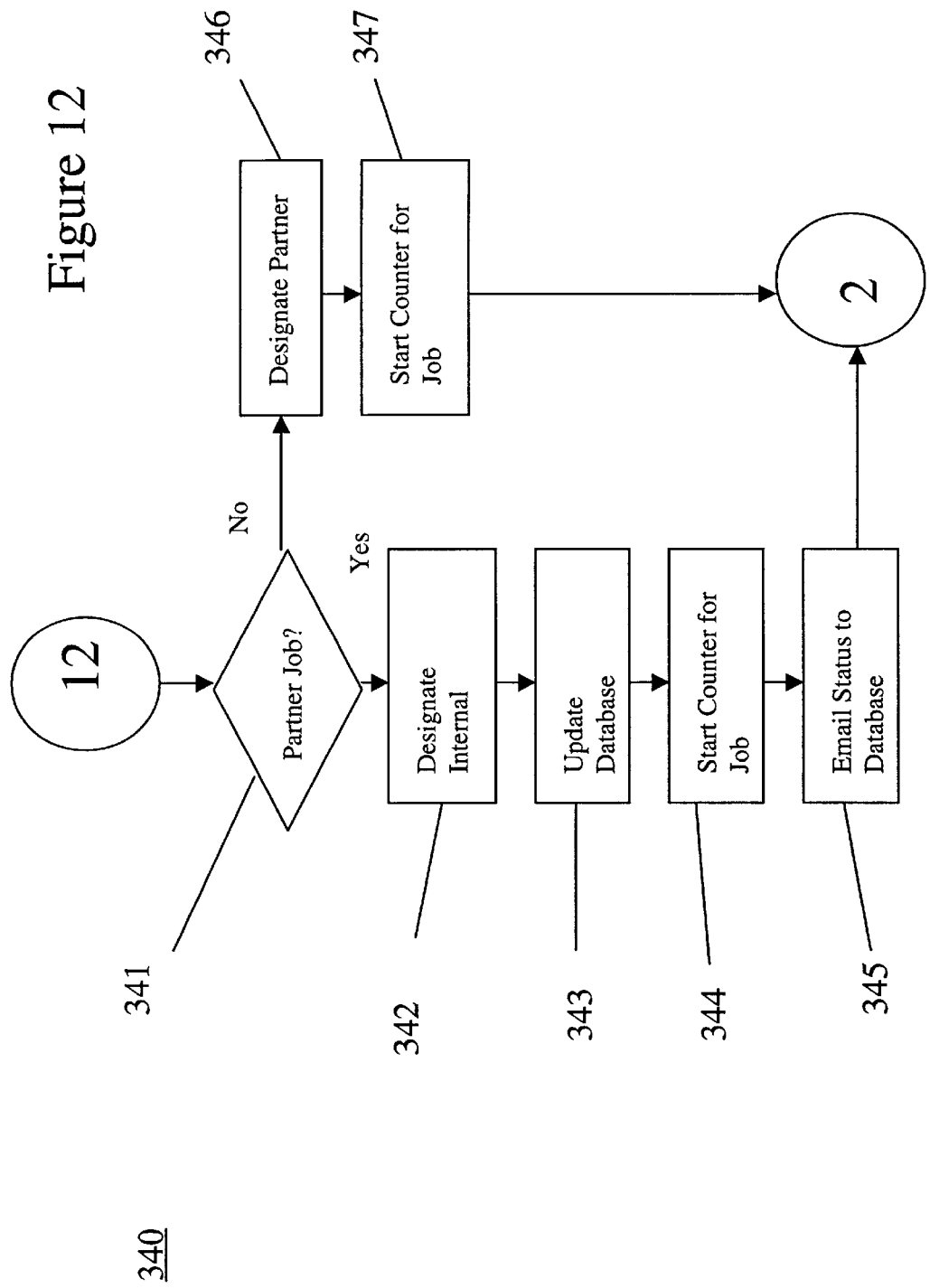
FIG. 12 is flow diagram showing a fourth step in the content distribution process of FIG. 3.

FIG. 12 shows a content engine notify step 340. Once the e-mails have been sent to the user computers 25 (recipients), the content server 13 should be notified that it can expect requests to view the content imminently. First, it is determined whether the job is an "internal" job or a "partner" job at step 341. If the job is a "partner" job, it is designated as such at step 346, and a counter is started at step 347. The counter functions as an indicator of how many times a particular "stream" is played (e.g., how many times a FLASH™ file associated with a particular e-mail is played). It is important to log this information, as a customer may have requested only a certain number of "streams", and therefore, once the playback limit is reached, the streams should be discontinued (See discussion below with reference to FIG. 13 and the "tracking" system). If the job is a "internal" job, it is designated as such at step 342, and the database server is updated that the job has been sent at step 343. Then, a counter is started at step 344, for "stream" tracking. Finally, an e-mail is sent from the e-mail server 12 to the database server 15 at step 345, notifying the database server of which e-mails were delivered to the intended recipients (user computers 25). For example, if any e-mails were undeliverable due to incorrect e-mail addresses, the e-mail sent to the database server 15 will so indicate.

Figure 4:
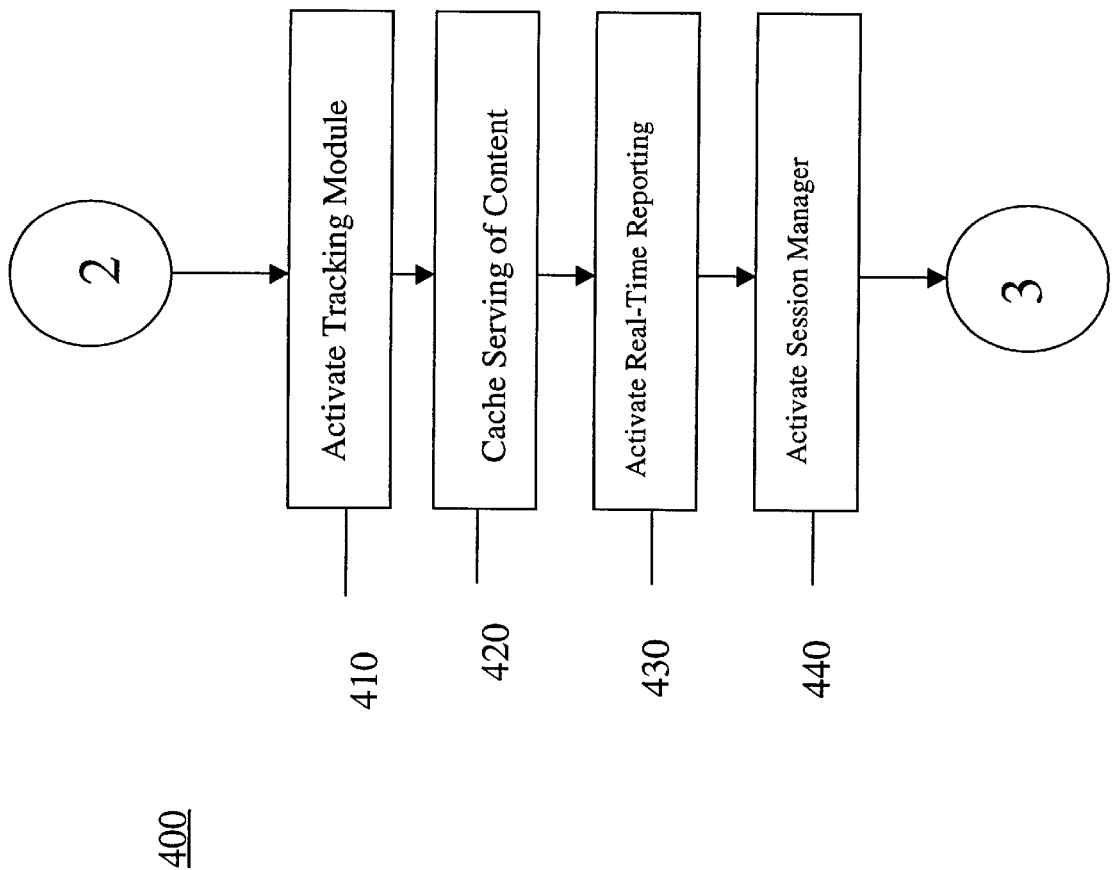
FIG. 4 is flow diagram showing an overall content tracking process according to an exemplary embodiment of the present invention.

FIG. 4 shows the details of the content tracking step 400. Once e-mails have been created and sent, the process according to the present invention tracks the subsequent course of the e-mails and the accessing of the content. As can be seen, the content tracking step 400 includes a tracking activation step 410, a caching step 420, a real-time reporting activation step 430, and a session manager activation step 440. Each of these steps will be explained in detail below with reference to FIGS. 13–16.

Figure 13:
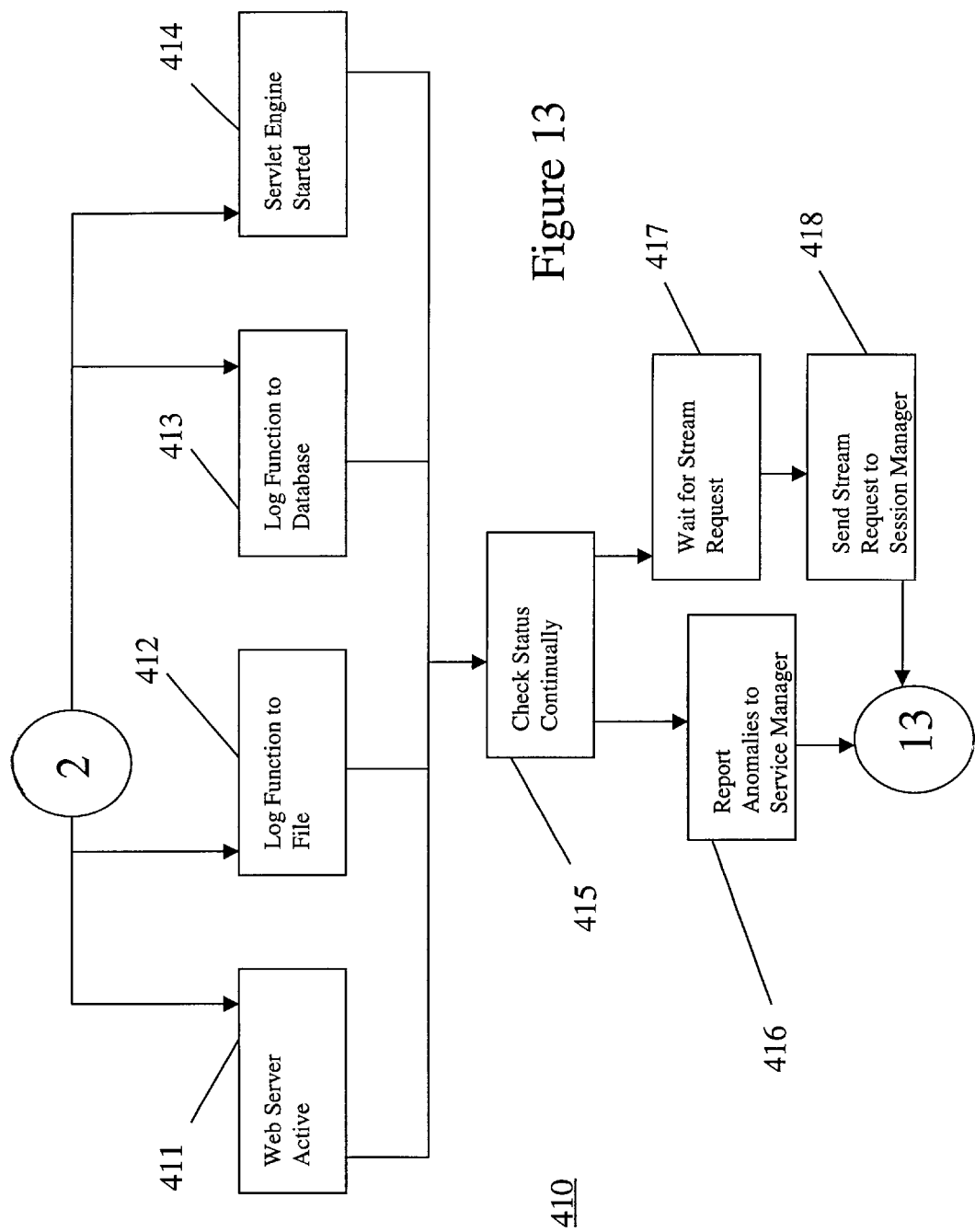
FIG. 13 is flow diagram showing a first step in the content tracking process of FIG. 4.

FIG. 13 shows a tracking activation step 410. The tracking activation begins with the activation of the reporting server 14 at step 411. Next, a program (engine), preferably resident on the reporting server 14, is started which logs all functions of the content server and e-mail server. Some of the functions logged include the: (a) IP address of the user (recipient), (b) domain of user, ©method(s) of access (e.g, HTTP Web access, User Login access), (d) bytes in, (e) bytes out, (f) processing time of user requests, (g) parameters passed (e.g., the actual command string used for calling a program), (h) HTML service level, (i) password used, and (j) login account. The functions are logged to files stored on the content server 13 at step 412 (and subsequently onto a primary server), and logged to a database stored on the database server 15 at step 413. Next, the reporting server 14 recognizes the starting of the servant engine (step 414). The servant engine is the program (engine), preferably stored on the content server 13, which serves the content to the user computers 25. As explained above with reference to FIGS. 6 and 9, the content is prepared (FIG. 6, steps 222–227) and packaged (FIG. 9, steps 313–318) as several different servlets, each servant being used selectively based on the capabilities of the user computer 25 viewing the content. The content serving and e-mailing processes are then continually monitored at step 415 a "watch" program module. If there are any anomalies in service, they are reported by the "watch" program (via e-mail, paging, etc.) to a service manager at step 416. Also, the number of requests for content ("stream requests") are monitored at step 417 (by the counter described above) and sent to a session manager at step 418. The session manager is another program module which retains and controls the online session status, including current request count, machine identification, and total use time. This information is stored in transaction log databases stored on the database server 15. If a maximum number of stream requests has been specified by the customer or the content provider, stream requests above that maximum will be denied.

Figure 14:
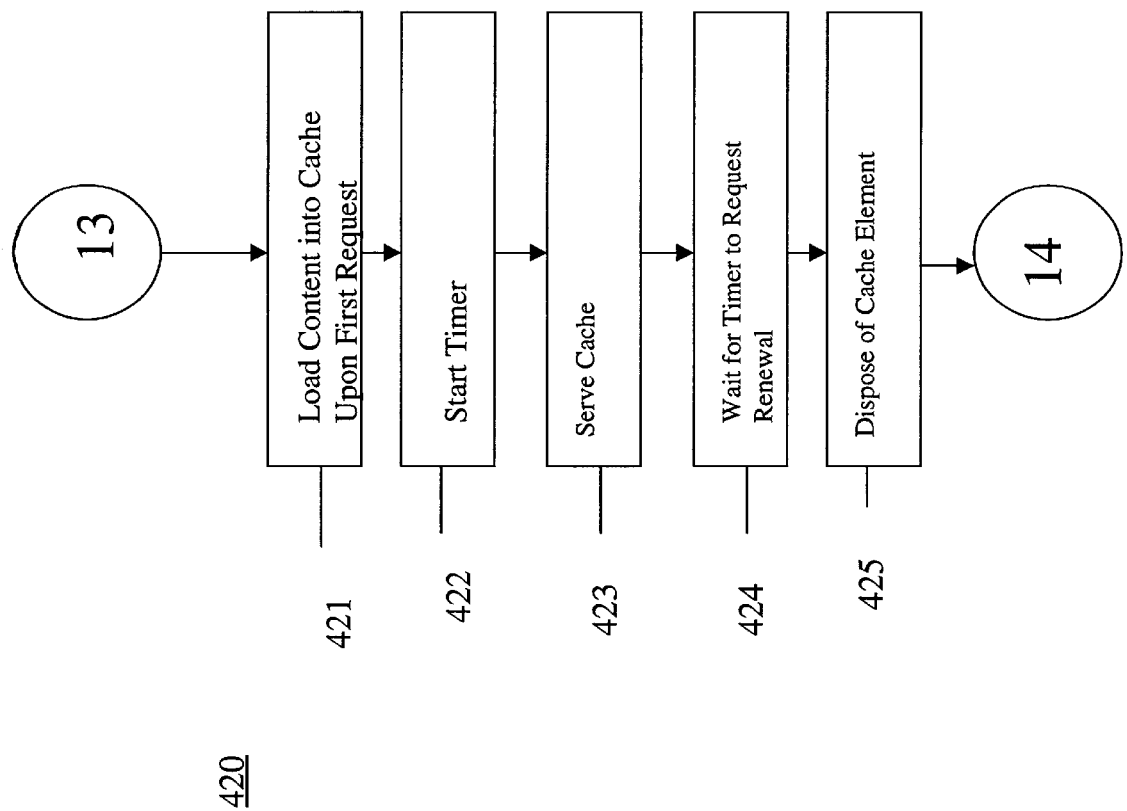
FIG. 14 is flow diagram showing a second step in the content tracking process of FIG. 4.

FIG. 14 shows a caching step 420. So that content stored on the content server 13 can be more easily accessed, the content is loaded into a cache of the content server upon the first stream request at step 421. Then, a timer is started at step 422 to provide time tracking of stream requests and other elements of the process. Then, the content in the cache is served to the user computer 25 (requestor) (step 423).

It is based on the bandwidth capabilities of the user computer 25. As stated above, different quality levels of content (e.g., low through high) are processed and are available to be served. The "bytes in" and "bytes out" information logged at steps 412 and 413 is used to determine the bandwidth capabilities of the user computer 25. For example, the servant engine on the content server 13 may include a master servant (prepared at step 226; FIG. 6) and five sub-servlets (prepared at steps 222–225 and 227; FIG. 6). The sub-servlets are used selectively based on, for example, the bandwidth capabilities of the user computer 25 and the particular e-mail and browser programs resident on the user computer 25. The five sub-servlets define a range of qualities which range from "low" to "high" (the "high" quality servant specifying the servant with most capabilities). For example, a user computer 25 which is running the most recent versions of Microsoft Internet Explorer™ and Microsoft Outlook™ will likely receive content from the "high" quality servant. However, a user computer 25 which is running an older or less sophisticated browser such as Mosaic™ and an older or less sophisticated e-mail program such as Eudora E-mail™ will likely receive content from the "low" quality servant. Thus, by the selection of the proper servant, the e-mail and the associated content are crafted to meet the particular needs of each user computer 25. Accordingly, each user computer 25 sees the highest possible grade message that her computer will let her see. It should be noted that although five servlets are described above, that number of servlets is only exemplary, and accordingly, any number of servlets may be used in connection with the present invention. Those of ordinary skill in the art will recognize that the use of additional servlets (or the use of a lesser number of servlets) merely requires adding (or removing) steps in the process 100 (which would preferably occur concurrently with steps 222–227 and steps 313–318 in FIGS. 6 and 9) for respectively generating and packaging the servlets. An additional number of servlets may be used to provide more quality options, whereas a lesser number of servlets may be used to simplify the process if the capabilities of the user computers 25 are known and not alterable.

When a maximum stream request is reached, or time runs out on the job (as measured by the timer), it is determined that the content requests have been completed at step 424. Then, the content is removed from the cache at step 425.

Figure 15:
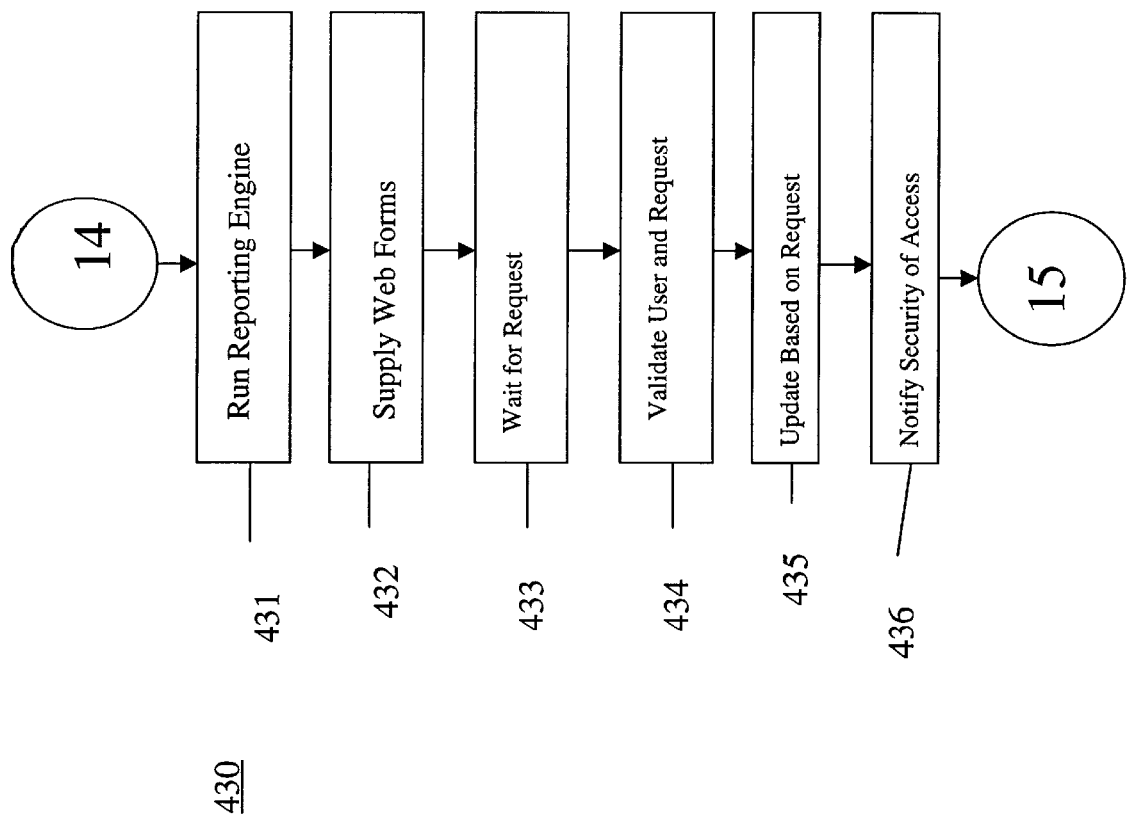
FIG. 15 is flow diagram showing a third step in the content tracking process of FIG. 4.

FIG. 15 shows a real-time reporting activation step 430. Once the e-mails have been sent to recipients and the content has been accessed, a real time reporting process begins (step 431). The process is begun by initializing a reporting engine which is preferably resident on the content server 13. The reporting engine takes information obtained from the tracking steps described above and reports them based on requests (typically by the customer or the content provider). At step 432, the reporting engine supplies web forms which may be accessed over the Internet (or an Intranet) by customers or managers. Once a request is made using the web forms (step 433), the system validates the requestor and request using a security measure (e.g., password, etc.) at step 434. Then, the system updates the reporting information based on the request at step 435. Finally, an entry is made in a security log identifying the requestor, date/time of access, etc. at step 436.

Figure 16:
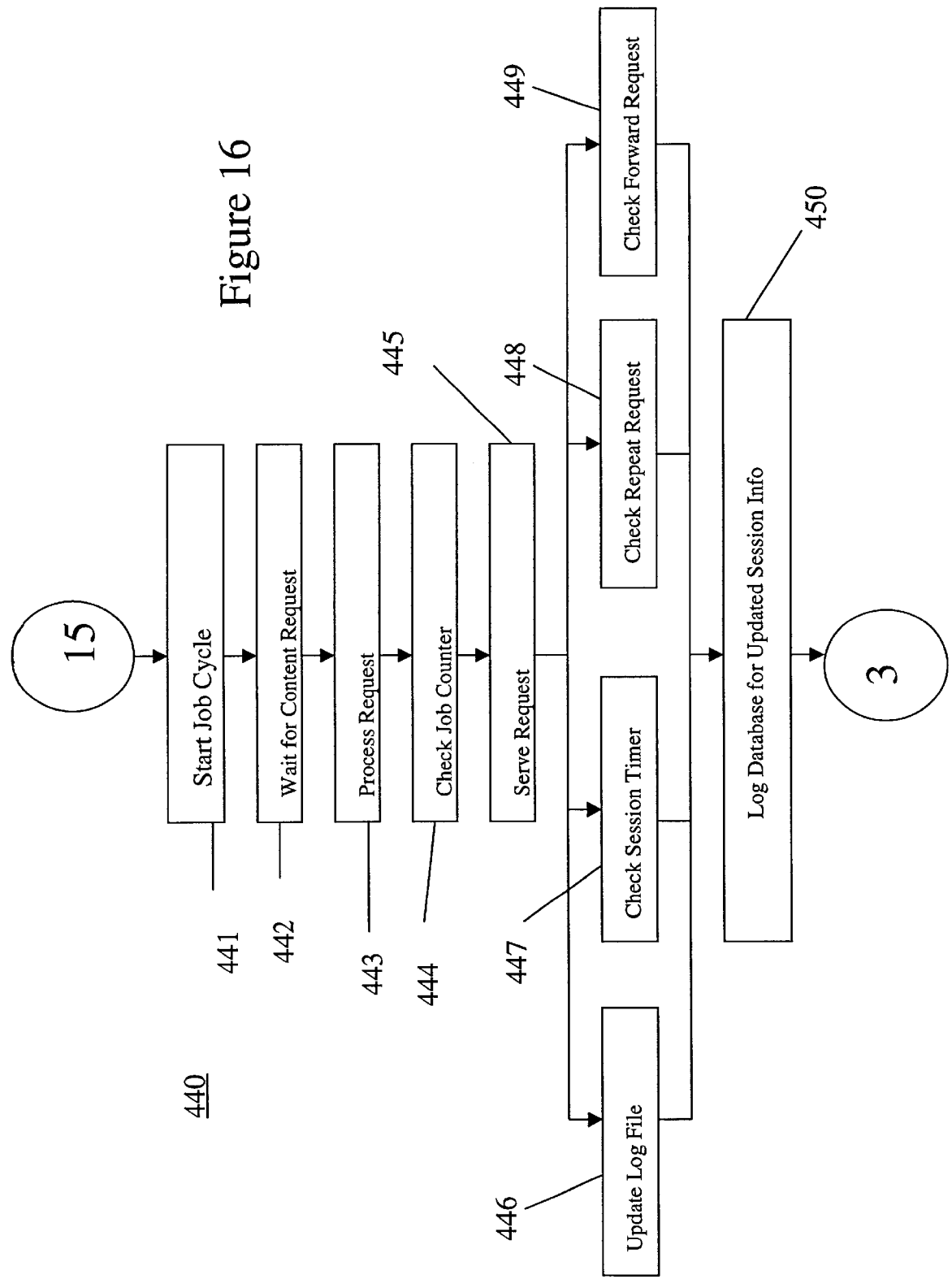
FIG. 16 is flow diagram showing a fourth step in the content tracking process of FIG. 4.

FIG. 16 shows a session manager activation step 440. The session manager is a separate program module (engine) within the reporting server 14 which monitors the overall system for user activity and connection. A "session" comprises each time a user computer accesses the content from the content server 13. The session ends when the users closes the e-mail and/or browser program, or after a specified time (controlled by the session timer, explained below). The session manager is started at step 441, when the session manager engine receives a notification from the e-mail server 12 that job has started. The engine then waits for content requests at step 442, and processes the requests at step 443. Before serving the content, the engine checks the job counter to ensure that a maximum number of stream requests have not been exceeded (step 444). If the maximum number of stream requests have not been exceeded, the content is served to the user at step 445, and all log files stored on the content server 13 (e.g., bytes in, bytes out, etc.; see step 412) are updated (step 446). A session timer is also checked to determine how long each session lasts (step 447). The session timer is restarted each time a new session begins. If there is no activity after a specified time, the session manager may end the session automatically. Finally, all "forward" requests and all "repeat" requests are logged to files on the content server (steps 448, 449). As a final step in the process, the transactional databases on the database server 15 are updated with any new information (e.g., "forward" requests, etc.) at step 450.

Although the process 100 described above references a content server 13 which performs both content serving and tracking functions, it is within the scope of the present invention to have separate servers for performing the content serving and tracking functions, respectively. Additionally, it should be noted that the different servers described above (e.g., e-mail server 12, content server 13, reporting server 14, and database server) may be operated by different entities, and it is not required that the servers all be operated by one entity.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A computer-implemented method for disseminating information, comprising the steps of:
    sending an electronic mail message to at least one recipient, said electronic mail being linked to a graphical presentation file;
    sensing the capabilities of the at least one recipient's computer with said sent electronic mail message; and,
    supplying based on said sensed capabilities only elements of the graphical presentation file which may be viewed on the at least one recipient's computer.

2. The computer-implemented method of claim 1, comprising the further step of:
    supplying only the elements of the electronic mail message which may be viewed on the at least one recipient's computer.

3. The computer-implemented method of claim 1, wherein the step of sensing the capabilities of the at least one recipient's computer comprises sensing the bandwidth capabilities of the at least one recipient's computer.

4. The computer-implemented method of claim 1, wherein the step of sensing the capabilities of the at least one recipient's computer comprises sensing the type of e-mail program stored on the at least one recipient's computer.

5. The computer-implemented method of claim 1, wherein the step of sensing the capabilities of the at least one recipient's computer comprises sensing the type of browser program stored on the at least one recipient's computer.

6. The computer-implemented method of claim 1, comprising the further step of:
    assigning a unique identification number specific to the electronic mail message sent to the at least one recipient.

7. The computer-implemented method of claim 6, comprising the further step of:
    storing the identification number for the electronic mail message in a database, so that the progress of the electronic mail message can be tracked.

8. The computer-implemented method of claim 1, wherein the graphical presentation file is a rich media file.

9. The computer-implemented method of claim 8, wherein said rich media file includes full-motion video, animation or a combination thereof.

10. The computer-implemented method of claim 1, wherein the step of supplying only the elements of the graphical presentation file which may be viewed on the at least one recipient's computer comprises:
    preparing a plurality of graphical presentation programs, each program corresponding to an element of the graphical presentation file.

11. The computer-implemented method of claim 10, wherein the step of supplying only the elements of the graphical presentation file which may be viewed on the at least one recipient's computer further comprises:
    packaging the plurality of graphical presentation programs.

12. The computer-implemented method of claim 10, wherein the step of supplying only the elements of the graphical presentation file which may be viewed on the at least one recipient's computer further comprises:
    utilizing the plurality of graphical presentation programs to selectively provide different elements of the graphical presentation file to the at least one recipient.

13. The computer-implemented method of claim 1, comprising the further step of:
    tracking the progress of the electronic mail message.

14. The computer-implemented method of claim 13, comprising the further step of:
    providing information about the progress of the electronic mail message to at least one computer.

15. The computer-implemented method of claim 1, comprising the further step of:
    tracking the progress of the graphical presentation file.

16. The computer-implemented method of claim 15, comprising the further step of:
    providing information about the progress of the graphical presentation file to at least one computer.

17. The computer-implemented method of claim 1, comprising the further step of:
    sensing the interests of the at least one recipient; and,
    altering the content of the electronic mail message based on the sensed interests of the at least one recipient.

18. The computer-implemented method of claim 1, comprising the further step of:
    sensing the interests of the at least one recipient; and,
    altering the content of the graphical presentation file based on the sensed interests of the at least one recipient.

19. The computer-implemented method of claim 1, wherein the step of sensing the capabilities of the at least one recipient's computer comprises sensing the type of web-based email platform that is being utilized by said recipient.

20. A computer system comprising:
    at least one server computer; and,
    at least one user computer coupled to the at least one server through a network,
    wherein the at least one server computer includes at least one program stored therein, said program performing the following steps:
    sending an electronic mail message to at least one recipient, said electronic mail being linked to a graphical presentation file;

sensing the capabilities of the at least one recipient's computer with the electronic mail message; and, supplying based on said sensed capabilities only elements of the graphical presentation file which may be viewed on the at least one recipient's computer.

21. The computer system of claim 20, wherein said program performs the further step of:

supplying only the elements of the electronic mail message which may be viewed on the at least one recipient's computer.

22. The computer system of claim 20, wherein the step of sensing the capabilities of the at least one recipient's computer comprises sensing the bandwidth capabilities of the at least one recipient's computer.

23. The computer system of claim 20, wherein the step of sensing the capabilities of the at least one recipient's computer comprises sensing the type of e-mail program stored on the at least one recipient's computer.

24. The computer system of claim 20, wherein the step of sensing the capabilities of the at least one recipient's computer comprises sensing the type of browser program stored on the at least one recipient's computer.

25. The computer system of claim 20, wherein said program performs the further step of:

assigning a unique identification number specific to the electronic mail message sent to the at least one recipient.

26. The computer system of claim 25, wherein said program performs the further step of:

storing the identification number for the electronic mail message in a database, so that the progress of the electronic mail message can be tracked.

27. The computer system of claim 20, wherein the step of sensing the capabilities of the at least one recipient's computer comprises sensing the type of web-based email platform that is being used by said recipient.

28. The computer system of claim 20, wherein the graphical presentation file includes a rich media file.

29. The computer system of claim 28, wherein said rich media file includes full-motion video, animation or a combination thereof.

30. A computer readable medium having embodied thereon a computer program for processing by a machine, the computer program comprising:

a first code segment for sending an electronic mail message to at least one recipient, said electronic mail being linked to a graphical presentation file;

a second code segment for sensing the capabilities of the at least one recipient's computer with the electronic mail message; and, a third code segment for supplying based on said sensed capabilities only elements of the graphical presentation file which may be viewed on the at least one recipient's computer.

31. A computer data signal embodied in a carrier wave encoded with computer program code for causing a processor to disseminate information comprising:

a first code segment for sending an electronic mail message to at least one recipient, said electronic mail being linked to a graphical presentation file;

a second code segment for sensing the capabilities of the at least one recipient's computer with the electronic mail message; and, a third code segment for supplying based on the sensed capabilities only elements of the graphical presentation file which may be viewed on the at least one recipient's computer.

32. A computer-implemented method for disseminating information, comprising the steps of:

sending an electronic mail message to at least one recipient, said electronic mail being linked to a graphical presentation file;

sensing the interests of the at least one recipient; and, altering the content of the electronic mail message based on the sensed interests of the at least one recipient.

33. The computer-implemented method of claim 32, comprising the further step of:

altering the content of the graphical presentation file based on the sensed interests of the at least one recipient.

34. The computer-implemented method of claim 32, wherein the step of sensing the interests of the at least one recipient comprises:

providing a query to the at least one recipient; and, utilizing a response to the query to sense the interests of the at least one recipient.

35. The computer-implemented method of claim 32, wherein the step of sensing the interests of the at least one recipient comprises:

determining if the at least one recipient has accessed the electronic mail message to sense the interests of the at least one recipient.

36. The computer-implemented method of claim 32, wherein the step of sensing the interests of the at least one recipient comprises:

determining if the at least one recipient has accessed the graphical presentation file to sense the interests of the at least one recipient.

37. A computer readable medium having embodied thereon a computer program for processing by a machine, the computer program comprising:

a first code segment for sending an electronic mail message to at least one recipient, said electronic mail being linked to a graphical presentation file;

a second code segment for sensing the interests of at least one recipient; and, a third code segment for altering the content of the electronic mail message based on the sensed interests of the at least one recipient.

38. The computer readable medium of claim 37, the computer program further comprising:

a fourth code segment for altering the content of the graphical presentation file based on the sensed interests of the at least one recipient.

39. A computer data signal embodied in a carrier wave encoded with computer program code for causing a processor to disseminate information comprising:

a first code segment for sending an electronic mail message to at least one recipient, said electronic mail being linked to a graphical presentation file;

a second code segment for sensing the interests of at least one recipient; and, a third code segment for altering the content of the electronic mail message based on the sensed interests of the at least one recipient.

40. The computer data signal of claim 39, the computer program code further comprising:

a fourth code segment for altering the content of the graphical presentation file based on the sensed interests of the at least one recipient.

41. A computer-implemented method for disseminating information, comprising the steps of:
(a) sending an electronic mail message to at least one recipient, said electronic mail message being associated with a graphical presentation file at a content server, said graphical presentation file including a plurality of elements;
(b) sensing the capabilities of the at least one recipient's computer with the electronic mail message; and,
supplying elements of the graphical presentation file to the recipient's computer specific to the sensed capabilities of the at least one recipient's computer, wherein a presentation of content to said user is optimized.

42. The computer-implemented method of claim 41, wherein the graphical presentation file includes a rich media file comprising full-motion video, animation or a combination thereof.

* * * * *

UNITED STATES PATENT AND TRADEMARK OFFICE
CERTIFICATE OF CORRECTION

PATENT NO. : 6,789,108 B1
DATED : September 7, 2004
INVENTOR(S) : David G. McMillan It is certified that error appears in the above-identified patent and that said Letters Patent is hereby corrected as shown below:

Column 1,
Line 37, delete "emails" and insert therefor -- e-mails --;

Column 2,
Lines 50 and 52, delete "Intra net" and insert therefor -- Intranet --;

Column 3,
Line 6, delete "click-through" and insert therefor -- click-throughs --;

Column 4,
Line 57, delete "screens" and insert therefor -- screen --;

Column 5,
Lines 11, 12, 13, 15, 16, 18, 20 and 21, each occurrence of "servant" should be replaced by -- servlet --; and
Line 21, "serviet" should be replaced by -- servlet --;

Column 7,
Lines 41, 43, 44, 47, 48 and 50, each occurrence of "servant" should be replaced by -- servlet --;

Column 8,
Line 47, delete "a" and insert therefor -- an --;

Column 9,
Lines 30, 31, 36, 66 and 67, each occurrence of "servant" should be replaced by -- servlet --
Line 60, insert -- important to note that the serving of the cache contents is -- after "it is";

Column 10,
Lines 7, 11, 15 and 16, each occurrence of "servant" should be replaced by -- servlet --;

UNITED STATES PATENT AND TRADEMARK OFFICE
CERTIFICATE OF CORRECTION

PATENT NO. : 6,789,108 B1
DATED : September 7, 2004
INVENTOR(S) : David G. McMillan It is certified that error appears in the above-identified patent and that said Letters Patent is hereby corrected as shown below:

Column 10 (cont'd),
Line 29, "serviets" should be replaced by -- servlets --.

Signed and Sealed this

Ninth Day of November, 2004

JON W. DUDAS
*Director of the United States Patent and Trademark Office*